United States Patent [19]
Saito et al.

[11] Patent Number: 5,826,133
[45] Date of Patent: Oct. 20, 1998

[54] IMAGE READING APPARATUS USEABLE IN A COPY MODE OR A FACSIMILE MODE

[75] Inventors: Masaaki Saito, Tokyo; Koji Takahashi, Yokohama; Masahiko Yokota, Tokyo, all of Japan

[73] Assignee: Canon Kabushiki Kaisha, Tokyo, Japan

[21] Appl. No.: 604,543

[22] Filed: Feb. 21, 1996

[30] Foreign Application Priority Data

Feb. 22, 1995 [JP] Japan ..................................... 7-033863

[51] Int. Cl.⁶ .................................................. G03G 15/00
[52] U.S. Cl. ................................ 399/2; 358/300; 358/496
[58] Field of Search .................................. 355/202, 233; 358/296, 300, 496, 498; 399/2, 75, 177

[56] References Cited

U.S. PATENT DOCUMENTS

| | | | |
|---|---|---|---|
| 4,475,128 | 10/1984 | Koumura . | |
| 4,743,974 | 5/1988 | Lockwood . | |
| 4,908,719 | 3/1990 | Nonoyama | ............................... 358/494 |
| 5,126,855 | 6/1992 | Saito | .................................... 358/496 X |
| 5,136,665 | 8/1992 | Inoue | .................................... 358/496 X |
| 5,280,368 | 1/1994 | Fullerton | ................................. 358/474 |
| 5,298,937 | 3/1994 | Telle | ........................................ 355/23 |
| 5,534,973 | 7/1996 | Harada | .................................... 355/202 |

*Primary Examiner*—Robert Beatty

[57] ABSTRACT

An image reading apparatus includes a stacking unit for stacking a plurality of originals, a separating unit for sequentially separating the original in the bottom portion among the originals on the stacking unit, a conveying unit for conveying the original which was sequentially separated by the separating unit along a conveying path, a first reading unit for reading the original surface which faces up when it is stacked onto the stacking unit when the original passes through the conveying path, a second reading unit for reading the original surface which faces down when it is stacked onto the stacking unit when the original passes through the conveying path, and a control unit for controlling the first and second reading units in accordance with a copy mode and a facsimile transmission mode, wherein the control unit allows the first reading unit to read the original in the copy mode and allows the second reading unit to read the original in the facsimile transmission mode.

20 Claims, 11 Drawing Sheets

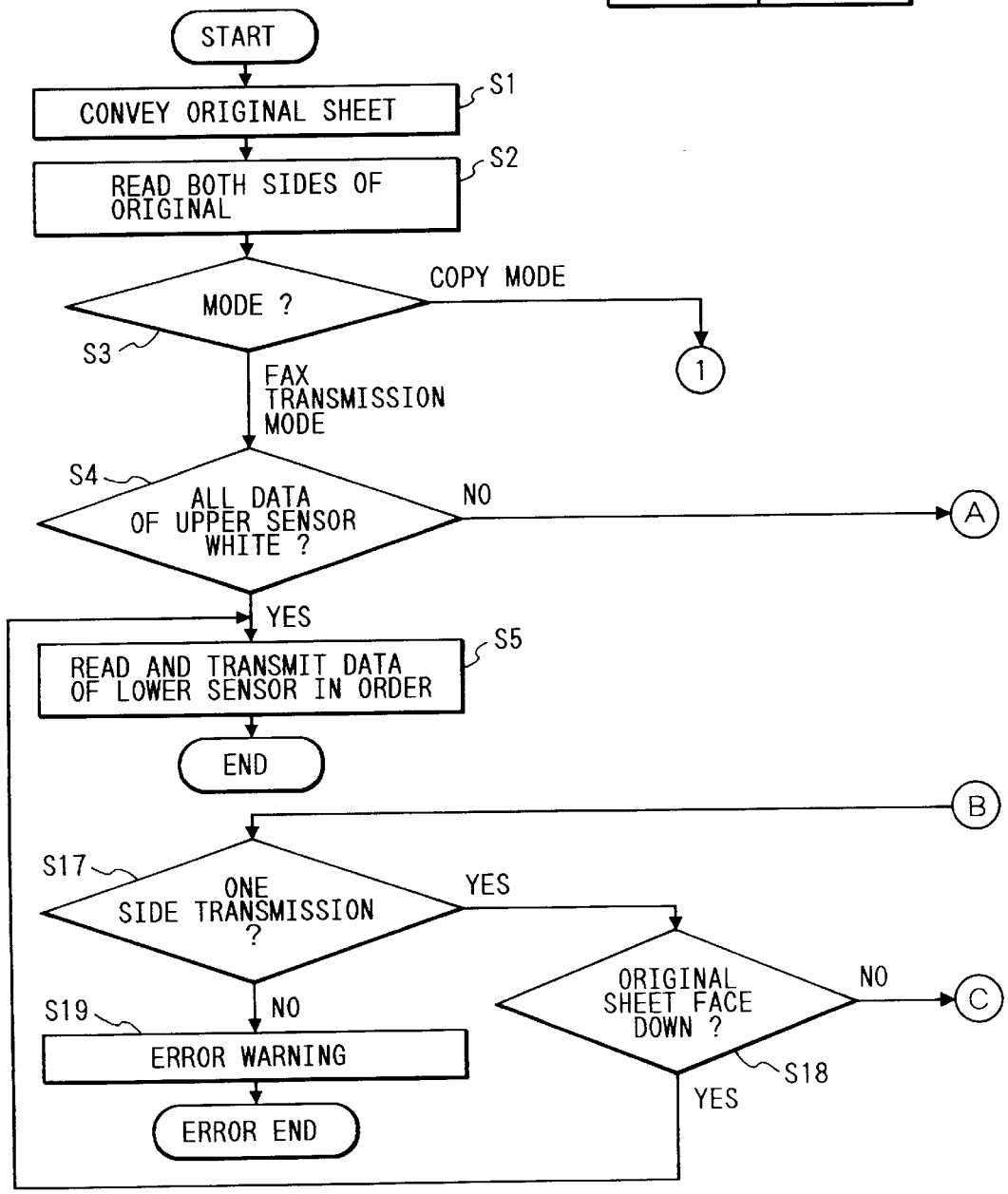

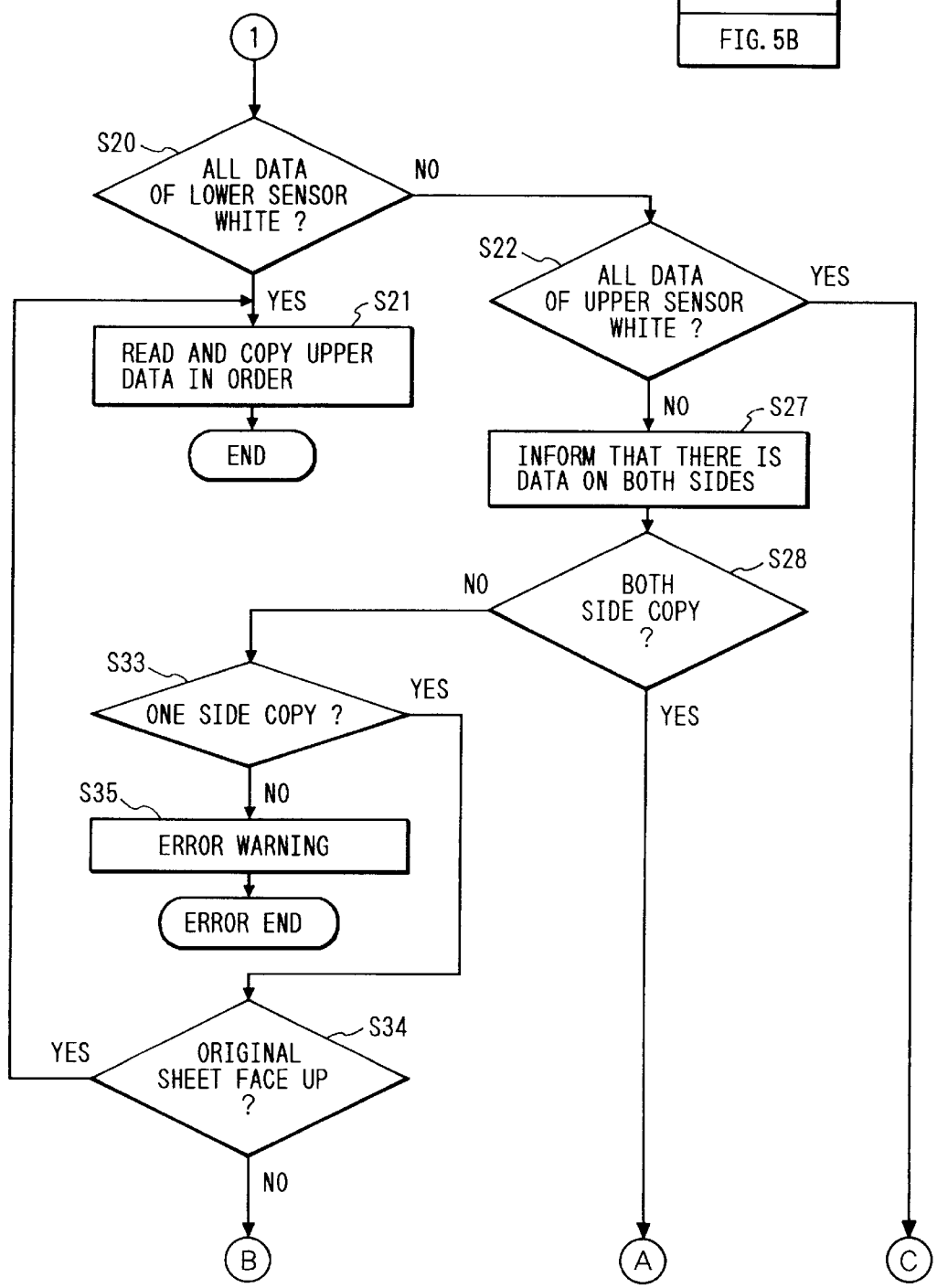

IMAGE READING APPARATUS USEABLE IN A COPY MODE OR A FACSIMILE MODE

BACKGROUND OF THE INVENTION

1. Field of the Invention

The invention relates to an image reading apparatus having a copy mode, a facsimile communication mode, and the like.

2. Related Background Art

Hitherto, in case of reading original sheets and transmitting by a facsimile apparatus, the original sheets are read from the first page in order to transmit images of the original sheets in accordance with the order from the first page, and in order to obtain a good use efficiency, it is necessary to eject and stack the original sheets in accordance with the order of the pages after the original images were read. In case of copying the original sheets, on the other hand, in order to obtain a good use efficiency, it is necessary to eject and stack the original sheets in accordance with the order of the pages after the original images were copied. The copied recording papers also need to be ejected and stacked in accordance with the order of the pages.

FIG. 9 shows a cross sectional view of a conventional facsimile apparatus having a copy function. In this apparatus, original sheets S are stacked in a face-down manner (namely, the recording surface faces down) in accordance with the order of the pages from the bottom onto an original supporting base plate 2 to stack the original sheets. When a transmission (facsimile function) or copy function is started, the original sheets are conveyed in accordance with the order from the bottom and are read out in accordance with the order from the first page and are ejected and stacked in accordance with the order of the pages.

When copying is performed, the images of the original sheets are recorded in accordance with the reading order and the recorded papers are stacked onto a recording paper ejection tray 12 in a face-up manner (namely, the recording surface faces up). On the other hand, when the original images are received, they are recorded in accordance with the receiving order and the recorded papers are stacked onto the recording paper ejection tray 12 in a face-up manner.

However, the above conventional apparatus has the following drawbacks.

The original sheets can be read only from the first page and cannot be read from the last page. Therefore, in the case where the user wants to read the original sheets from the last page in different functions such as facsimile function, copy function, and the like, the apparatus cannot be used in accordance with the function, so that a use efficiency is bad.

There is also a case where the front and back sides of the original sheets are erroneously set and an erroneous operation is caused.

In order to sort the copied recording sheets in accordance with the order of pages, in case of copying, means for reversing the original sheets to the order opposite to that of the pages and subsequently reading the reversed original sheets is needed or means for sorting the read-out image data in a software manner is necessary, so that construction of the apparatus is complicated and the reliability deteriorates.

SUMMARY OF THE INVENTION

It is an object of the invention to provide an apparatus which can solve the drawbacks of the above conventional apparatus.

Another object of the invention is to provide an image forming apparatus at low costs in which originals can be read from either one of the order from the first page and the order from the last page by merely changing a method of stacking original sheets without making a construction of the apparatus complicated, thereby enabling the apparatus to be used in accordance with a desired function, and a good use efficiency is obtained.

Another object of the invention is to provide an image forming apparatus in which by displaying either one of a mode for reading original sheets from the first page and a mode for reading from the last page, an erroneous operation is prevented and a high reliability and a good use efficiency are obtained.

Further another object of the invention is to provide an image forming apparatus at low costs in which recording papers on which images of original sheets were copied can be ejected in accordance with the order of pages without making a construction of the apparatus complicated and a high reliability is obtained.

The above and other objects and features of the present invention will become apparent from the following detailed description and the appended claims with reference to the accompanying drawings.

DETAILED DESCRIPTION OF THE PREFERRED EMBODIMENTS

[First embodiment]

Figure 1:
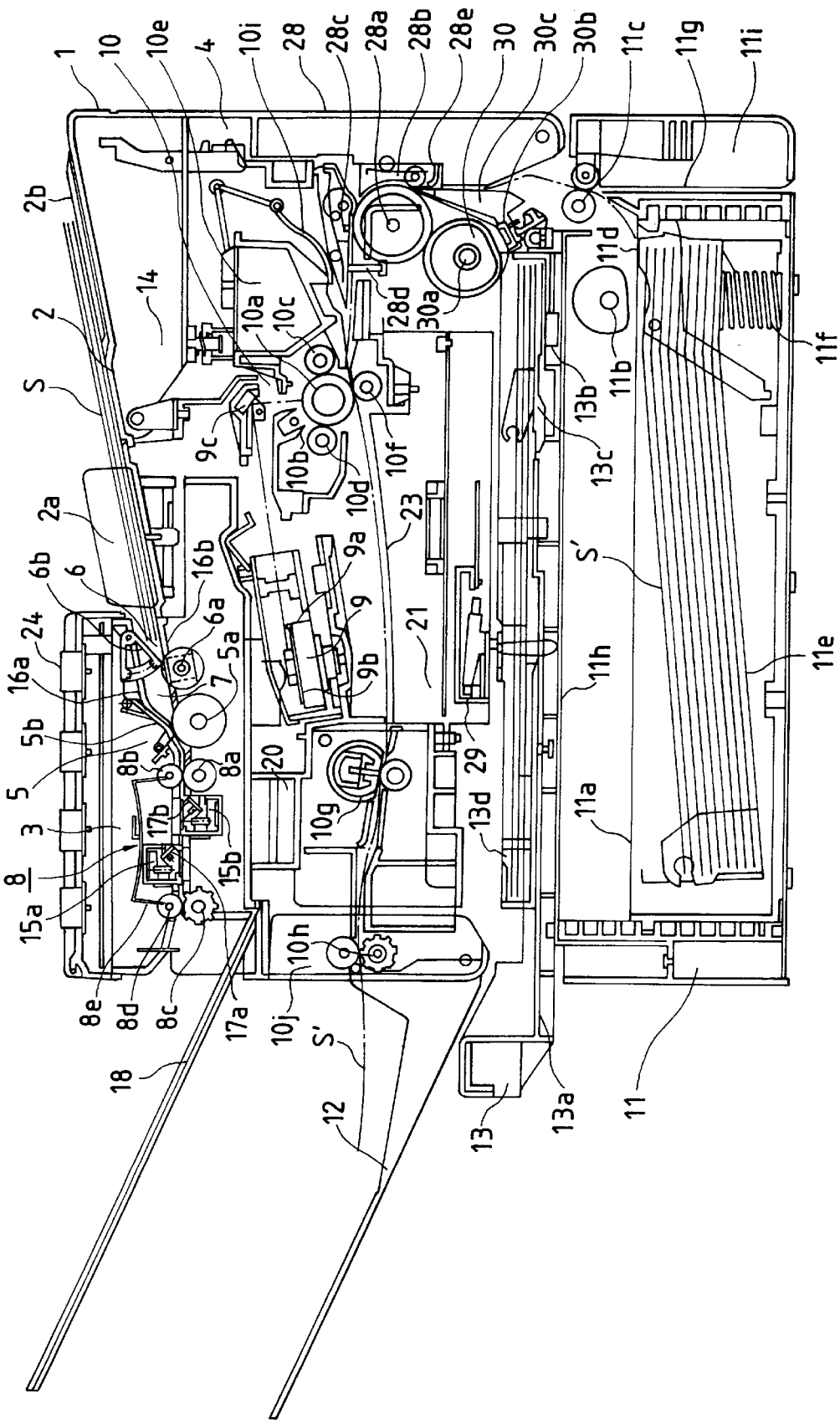
FIG. 1 is a cross sectional view of a facsimile apparatus of the first embodiment.
Figure 2:
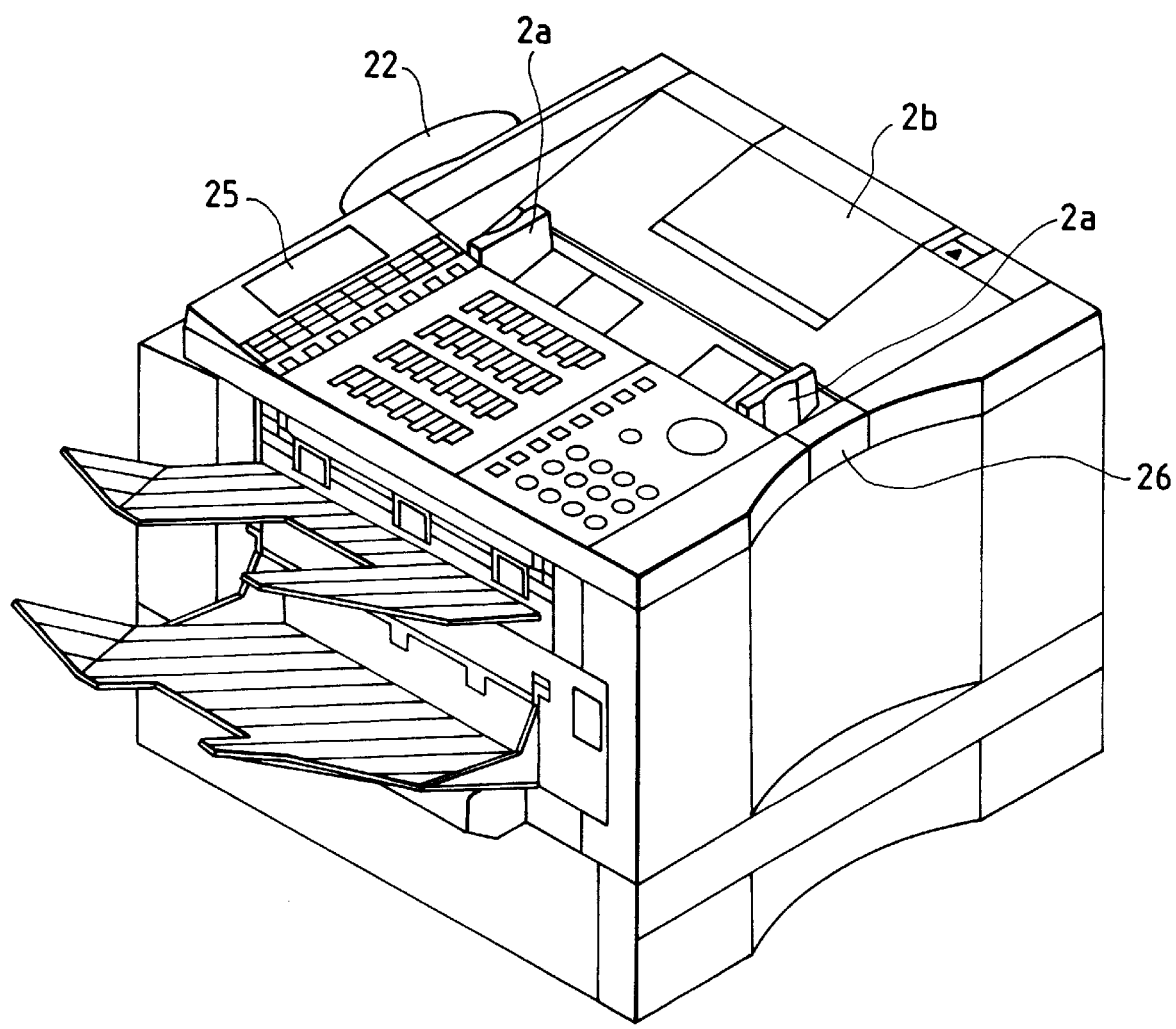
FIG. 2 is a perspective view of the facsimile apparatus of the first embodiment.
Figure 3:
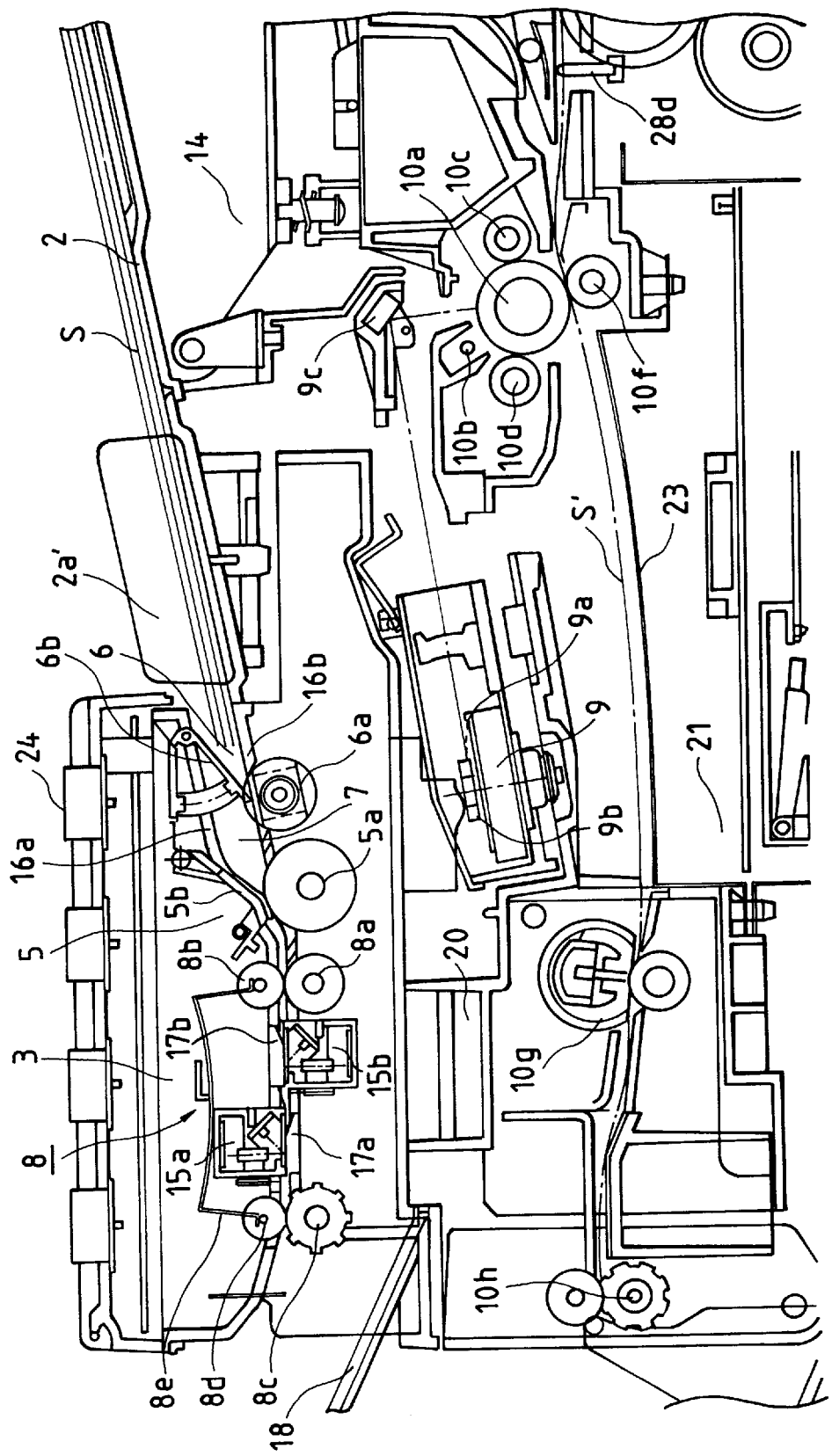
FIG. 3 is an enlarged diagram of an image reading unit in the first embodiment.
Figure 4B:
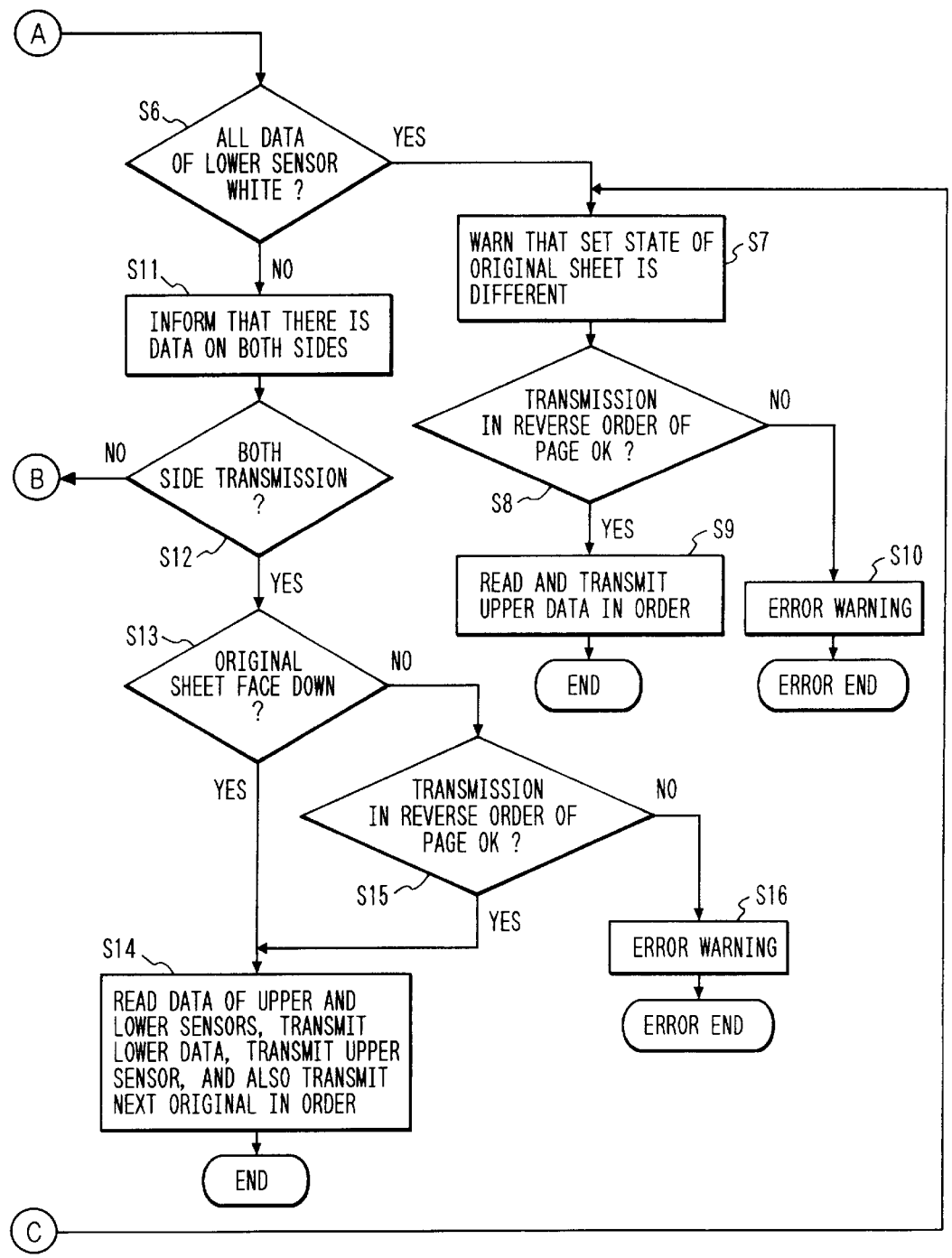
FIG. 4 is comprised of FIGS. 4A and 4B showing flowcharts (1) in the first embodiment.
Figure 5B:
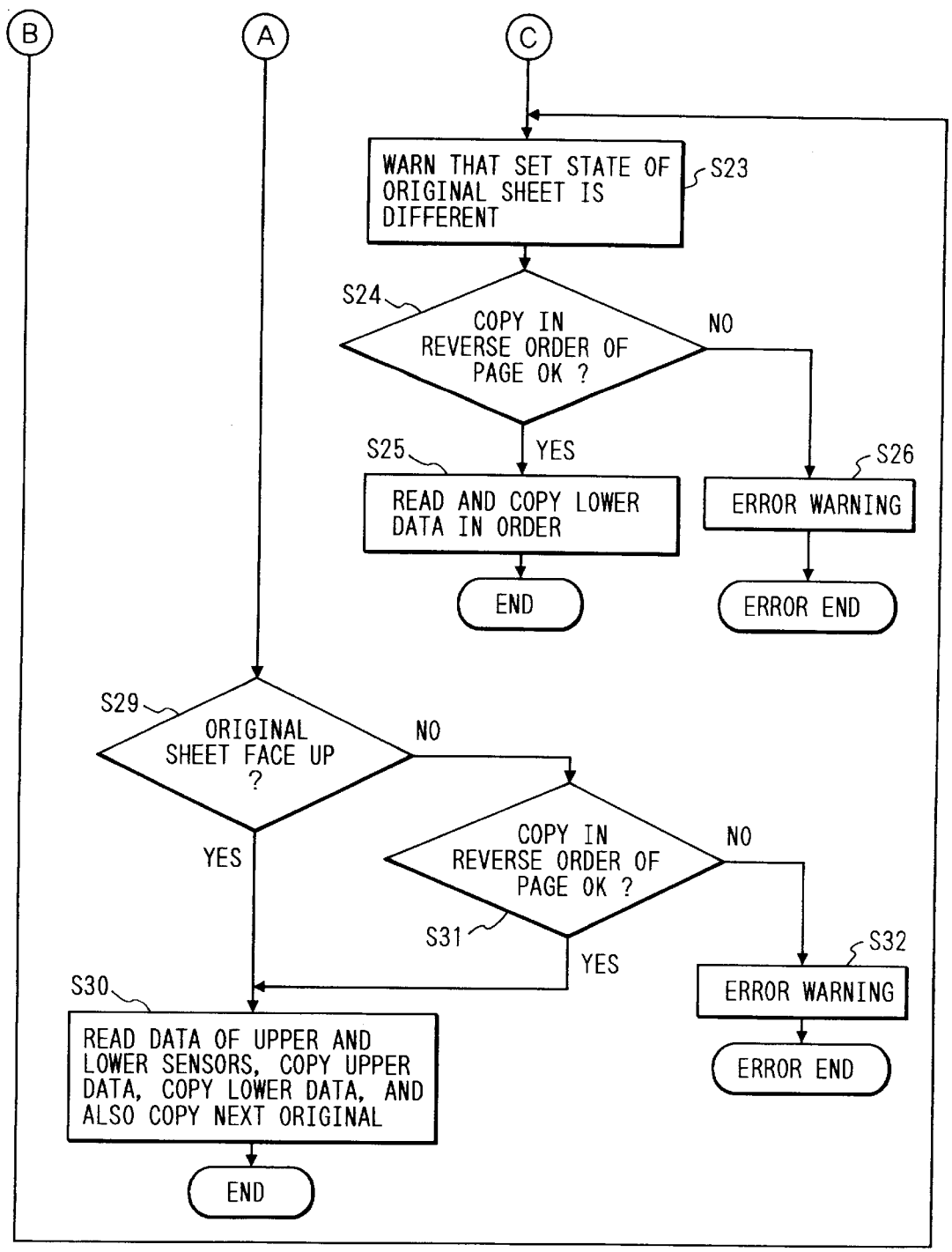
FIG. 5 is comprised of FIGS. 5A and 5B showing flowcharts (2) in the first embodiment.

FIGS. 1, 2, and 3 are diagrams showing most preferably a feature of the invention. An outline of an entire facsimile apparatus using an image reading apparatus constructed according to the invention will now be described with reference to FIGS. 1 to 3.

In the diagrams, reference character S denotes the original sheets as targets to be read; 1 indicates an apparatus main body; 2 the original supporting base plate which is constructed so that a plurality of original sheets S can be stacked onto an upper cover of the apparatus main body 1; 3 an image reading unit to read image information of the original sheets S; 4 a recording unit comprising a laser beam printer; 9 a laser scanner; 10 an image forming unit; 11 a cassette feeding unit; 12 the recording paper ejection tray; 13 an MP (multi recording paper) cassette unit; 14 a cartridge cover which can be opened and closed; 20 a partition portion between the image reading unit and the recording unit; 21 a control unit of the facsimile apparatus; 22 a handset; 23 a conveying guide; 24 an operating unit; 25 a display unit also serving as a touch panel; 26 a tarry lamp to indicate an operating state of the facsimile apparatus; 28 a cover; 29 an MP cassette sensor; and 30 an MP separating unit.

FIG. 3 shows an enlarged diagram of the image reading unit 3. Reference numeral 5 denotes separating means comprising a separating roller 5a and a separating member 5b for separating the stacked original sheets S one by one from the bottom. When the original sheets S are stacked in a face-up manner, the original sheets are sequentially separated and fed in accordance with the order from the last page. When the sheets are stacked in a face-down manner, they are sequentially separated and fed from the first page. Reference numeral 6 denotes spare conveying means comprising a spare conveying roller 6a and a spare pressure contact arm 6b to convey the original sheets S to the separating means 5; 7 separation conveying means comprising the separating means 5 and spare conveying means 6; 8 conveying means comprising a feed roller 8a and a feed roller 8b to convey the original sheets S which were separated one by one, a paper ejection roller 8c, a paper ejection roller 8d, and a roller pressing spring 8e. An automatic document feeder is constructed by the above component elements 5 to 8. Reference numerals 15a and 15b denote contact type image sensors for reading images of the front and back sides of each original sheet S; 16a and 16b an upper original guide and a lower original guide; 17a and 17b original pressing Mylars for pressing each original sheet S onto the contact type image sensors 15a and 15b, thereby allowing the sheet to be adhered thereon; and 18 an original ejection tray on which the original sheets S after the images were read are stacked. The contact type image sensor 15a and original pressing Mylar 17b are arranged on the upper original guide 16a. The contact type image sensor 15b and original pressing Mylar 17a are arranged on the lower original guide 16b.

The original sheets S stacked on the original supporting base plate 2 are conveyed by the spare conveying roller 6a and spare pressure contact arm 6b. The original sheet S at the bottom position is separated and conveyed one by one by the separating roller 5a and separating member 5b. Further, the original sheets are conveyed to the contact type image sensors 15a and 15b by the feed roller 8a, feed roller 8b which is pressed by the roller pressing spring 8e, and the like. The original sheets S are pressed onto the contact type image sensors 15a and 15b by the original pressing Mylars 17a and 17b and are adhered, thereby reading the image information of the original sheets S in such a contact state. The original sheets S are ejected to the original ejection tray 18 by the paper ejection roller 8c and paper ejection roller 8d which is pressed by the roller pressing spring 8e. For this interval of time, the original sheet S is guided by the upper original guide 16a and lower original guide 16b.

A slider 2a which is slidable in the direction (width direction of the original sheet S) perpendicular to the conveying direction of the original sheet is provided for the original supporting base plate 2. Both sides of the original sheets S stacked on the original supporting base plate 2 can be aligned by the slider 2a. When the original sheets S are the long originals, by opening an extension original tray 2b, it is possible to prevent that the rear edge portions of the original sheets S overflow from the original supporting base plate 2 and hang down.

In the contact type image sensors 15a and 15b, a light is irradiated from an LED array as a light source to the image information surface of the original sheet S and the reflection light reflected by the image information surface is formed as an image onto a sensor element by a SELFOC lens, thereby reading the image information.

In the recording unit 4, a laser beam is emitted from a laser beam oscillator 9a of the laser scanner 9 on the basis of an image signal outputted from the control unit 21. The laser beam is reflected by a polygon mirror 9b and a mirror 9c and is irradiated onto a photosensitive drum 10a of the image forming unit 10, thereby forming image information onto the surface of the photosensitive drum 10a. The image information is transferred onto a recording sheet S' fed to the image forming unit 10 from the cassette feeding unit 11 or MP cassette unit 13 and is fixed. After that, the recording sheet is ejected to the recording paper ejection tray 12. In this instance, the recording surface of the recording sheet S' faces up and the recording sheets are stacked from the top in accordance with the order at which they are ejected to the recording paper ejection tray 12.

The photosensitive drum 10a is integratedly built in a recording cartridge 10e together with a primary charging unit 10b, a developing roller 10c, and a cleaning roller 10d and is detachably set into the apparatus main body 1. The surface of the photosensitive drum 10a is uniformly charged by the primary charging unit 10b. When the laser beam is reflected by the polygon mirror 9b and returning mirror 9c and is irradiated onto the surface of the drum 10a, a latent image is formed thereon. The latent image is developed by a toner which is supplied from the developing roller 10c.

A transfer charging unit 10f is arranged in the peripheral portion of the photosensitive drum 10a of the image forming unit 10. A heat fixing unit 10g and a paper ejection roller 10h are arranged on a recording paper conveying path on the downstream side than the photosensitive drum 10a.

After the toner image formed on the surface of the photosensitive drum 10a was transferred onto the recording sheet S' by the transfer charging unit 10f, the recording sheet is conveyed along the conveying guide 23. The toner image is fixed by the heat fixing unit 10g. After that, the recording sheet is ejected to the recording paper ejection tray 12 by the paper ejection roller 10h. In this instance, the recording surface of the recording sheet S' faces up and the recording sheets are stacked onto the tray 12 in accordance with the ejecting order.

The MP cassette unit 13 is arranged on the slightly lower side at the center of the apparatus main body 1. An MP middle plate 13c is rotated upward by a pressure contact member 13b, so that the recording sheets S' stacked in an MP cassette 13a come into pressure contact with an MP separating roller 30a and are separated one by one by an MP separating pad 30b (friction member separating method) and are conveyed along an MP separating base 30c. Further, the recording sheets are reversed by a conveying roller 28a, a cover side U-turn guide 28b arranged on the cover 28, and a main body side U-turn guide 28c arranged on the side of the apparatus main body 1. A front edge of the recording sheet S' during the conveyance is detected by a resist sensor 28d. A paper feed timing and an image output timing are matched so that the front edge of the toner image formed on the photosensitive drum 10a coincides with the front edge of the recording sheet S'. After that, the recording sheet is conveyed to a position between the transfer charging unit 10f and the photosensitive drum 10a. The image is recorded on the back side of the recording sheet S' stacked in the MP cassette 13a.

A side edge surface and a rear edge surface of the recording sheet S' are restricted by an MP restriction plate 13d which is movably attached in accordance with the recording sheet size, thereby preventing occurrence of an oblique motion or a non-feeding operation. The size of recording sheet S' and the presence or absence thereof are detected by the MP cassette sensor 29. The number of recording sheets which can be stacked is set to 100. The cassette is constructed so that it can be pulled out to the left side toward the apparatus main body 1 (side loading method). As a size of recording sheets which can be stacked, there are three kinds of sizes of A4, letter (LTR), and legal (LGL).

The cassette feeding unit 11 is arranged so that a top plate 11$h$ of the cassette feeding unit 11 comes into contact with the lower surface of the bottom portion of the apparatus main body 1. The upper surface of the top plate 11$h$ is used as a bottom plate of the apparatus main body 1. A middle plate 11$e$ is urged upward by a middle plate spring 11$f$, so that the recording sheets S' stacked in a feed cassette 11$a$ are separated one by one by a semicircular feed roller 11$b$ and a pair of separating claws 11$d$ (claw separating method). The separated recording sheet S' is conveyed by a pair of cassette conveying rollers 11c and passes through a space between the MP separating base 30$c$ and a paper passage guide 28$e$ and is reversed by the conveying roller 28$a$, U-turn guide 28$b$ on the cover side arranged on the cover 28, and U-turn guide 28$c$ on the main body side arranged on the side of the apparatus main body 1. The operations from this position are similar to the feeding operations from the MP cassette unit 13 mentioned above. A paper path joins at a position just before the conveying roller 28$a$. The image is recorded to the back side of the recording sheet S' stacked in the feed cassette 11$a$.

The number of recording sheets which can be stacked in the cassette 11$a$ is set to 500 and is constructed so that the cassette can be pulled out to the front side for the apparatus main body 1 (front loading method). As a size of recording sheets which can be stacked, there are two kinds of sizes of A4 and letter (LTR).

The cassette 11$a$ can be separated from and coupled to the cassette feeding unit 11 as an option. The number of recording sheets which can be stacked in the entire apparatus can be varied in a range from 100 to 600.

The cartridge cover 14 is provided for the apparatus main body 1 so that it can be opened and closed. By opening the cartridge cover 14, the recording cartridge 10$e$ can be pulled out to the outside of the apparatus main body 1 and can be exchanged. The cartridge cover 14 has an interlocking mechanism. When the cartridge cover 14 is open or the recording cartridge 10$e$ is not set to the apparatus main body 1, the recording unit 4 doesn't operate. A drum exposure preventing shutter 10$i$ provided for the recording cartridge 10$e$ is interlocked with the setting of the recording cartridge 10$e$ to the apparatus main body 1. When the cartridge cover 14 is opened and the recording cartridge 10$e$ is set into the apparatus main body 1, the shutter 10$e$ is opened. When the recording cartridge 10$e$ is taken out from the apparatus main body 1, the shutter 10$e$ is closed, thereby preventing that the photosensitive drum 10$a$ is unnecessarily exposed.

The partition portion 20 functions as a duct for separating the image reading unit 3 and recording unit 4. By allowing the air to flow into the partition portion 20 by a fan (not shown), it is prevented that the image reading unit 3 is adversely influenced by the heat generated from the recording unit 4 and that the vapor evaporated from the recording sheet S' is dew-condensed and is dropped onto the recording sheet S'.

An operating procedure of the facsimile apparatus of the embodiment will now be described with reference to flowcharts of FIGS. 4A to 5B.

In case of performing a facsimile transmission in the facsimile mode, the operator sets the original sheets S onto the original supporting base plate 2 in accordance with the order of pages so that the original surface faces down (in a face-down state). In case of executing the copy mode, the operator sets the original sheets S onto the original supporting base plate 2 in accordance with the order of pages so that the original surface faces up (in a face-up state).

The original setting methods which are different in the facsimile transmission mode and the copy mode are displayed on the display unit 25, thereby informing to the operator.

Namely, "Set the originals in face-down manner" is displayed on the display unit 25 in the facsimile mode. "Set originals in face-up manner" is displayed on the display unit 25 in the copy mode.

When the operation is started, the original sheets S are conveyed to the separating means 5 by the spare conveying roller 6$a$ and spare pressure contact arm 6$b$ and the original sheets S are conveyed one by one from the bottom by the separating roller 5$a$ and separating member 5$b$ (S1). The first original sheet is further conveyed by the feed roller 8$a$ and the images of both sides are read by the contact type image sensors 15$a$ and 15$b$ arranged on the upper and lower original guides 16$a$ and 16$b$, respectively (S2).

A check is now made to see if the function which is operating is the facsimile transmission mode or the copy mode (S3). In case of the facsimile mode, a check is made to see if the entire data corresponding to one page that is read by the contact type image sensor 15$a$ arranged on the upper original guide 16$a$ is white (S4). When the original sheet S has correctly been set on the original supporting base plate 2, this means that the entire data is white. Therefore, the data of the contact type image sensor 15$b$ arranged on the lower original guide 16$b$ is set to the data of the first page. When there are a plurality of original sheets S, the images of the original sheets S are read by the contact type image sensor 15$b$ arranged on the lower original guide 16$b$ and the read image data is transmitted and this operation is sequentially repeated (S5). In step S5, it is assumed that the process in step S4 is executed every page. After the images of the original sheets S were read, the sheets are further conveyed by the paper ejection roller 8$c$ and are stacked onto the original ejection tray 18. In this instance, the original sheets S are sequentially read in order of pages from the first page and are ejected and stacked onto the original ejection tray 18. After completion of the operation, the original sheets S are ejected and stacked onto the original ejection tray 18 in accordance with the order of pages in a state in which the original surface faces down (in a face-down manner).

In step S4, when the entire data of the contact type image sensor 15$a$ is not white, a check is made to see if the entire data of one page that is read by the contact type image sensor 15$b$ arranged on the lower original guide 16$b$ is white or not (S6). When the entire data is white, it is judged that the front and back sides of the original sheet S have been erroneously set, so that a warning indicating that the setting state of the original sheet is wrong is displayed on the display unit 25 and a warning sound is generated from a speaker 307 (S7). In this setting state, if the user tries to read the image of the original sheet S by the contact type image sensor 15$a$ arranged on the upper original guide 16$a$ and the read image data is transmitted, the images are read from the last page. Therefore, whether the pages can be transmitted in reverse or not is selected by the user by the touch panel of the display unit 25 (S8). When it is selected that the pages can be transmitted in reverse, the data which was read by the contact type image sensor 15$a$ arranged on the upper original guide 16$a$ is set to the data of the first page and is transmitted. When there are a plurality of original sheets S, the images of the original sheets S are read by the contact type image sensor 15*a* arranged on the upper original guide 16*a* and the read image data is transmitted and this operation is sequentially repeated (S9). After the images of the original sheets S were read, the sheets are further conveyed by the ejection roller 8*c* and are stacked onto the original ejection tray 18. In this instance, the original sheets S are sequentially read in accordance with the order of pages from the last page and are ejected and stacked onto the original ejection tray 18. After completion of the operation, the original sheets are ejected and stacked onto the original ejection tray 18 in a face-up manner in accordance with the order of pages. On the other hand, when it is selected that it is improper if the pages are transmitted in reverse, an error warning is displayed on the display unit 25. A warning sound is generated from the speaker 307 (S10). The processing routine is finished as an error. The operator again sets the original sheets S by reversing the front and back sides.

In steps S4 and S6, when both of the entire data read by the contact type image sensors 15*a* and 15*b* are not white, it is judged that both sides of the front and back surfaces of the original sheet S are originals. A fact that the original sheet S is the both-side original is displayed on the display unit 25 and a warning sound is generated from the speaker 307 (S11). Whether the image data of both sides can be transmitted or not is selected by the user (S12). When a mode for transmitting the data of both sides is selected, if the original sheet S has been set in a face-up state, the pages are transmitted in reverse, so that the setting state of the original is confirmed by the operator before transmission (S13). When the operator inputs information indicating that the originals have been set in a face-down state, the image read by the lower sensor is transmitted as a first page and the image read by the upper sensor is subsequently transmitted as a second page. When there are a plurality of original sheets S, in a manner similar to the above with respect to the next original sheet, the images of both sides of the original sheet S are read by the contact type image sensors 15*a* and 15*b* arranged on the upper and lower original guides 16*a* and 16*b*, the image on the lower side is transmitted, the image on the upper side is transmitted, and these operations are sequentially repeated after that (S14). When the operator inputs information indicating that the originals have been set in a face-up state, whether the pages can be transmitted in reverse or not is selected by the operator (S15). When the operator inputs information indicating that the pages can be transmitted in reverse, the images of both sides of the original are transmitted in accordance with the reverse order of pages (S14). If information indicating that it is improper to transmit the pages in accordance with the reverse order of pages is inputted, an error warning is displayed on the display unit 25 and a warning sound is generated from the speaker 307 (S16). The processing routine is finished as an error. When the both-side transmission mode is not selected in step S12, whether the transmission of only one side is performed or not is selected by the user (S17). In case of transmitting only one side, the setting state of the original surfaces is confirmed by the operator (S18). When the originals have been set in a face-down state, the processing routine jumps to step S5. When the originals have been set in a face-up state, step S7 follows. When information indicating that both of the both-side transmission and the one-side transmission are not performed is inputted, an error warning is displayed on the display unit 205 and a warning sound is generated from the speaker (S19). The processing routine is finished as an error. The will of the operator is inputted from the operating unit 24 or touch panel 25.

When the copy mode is judged in step S3, a check is made to see if the entire data that is read by the contact type image sensor 15*b* arranged on the lower original guide 16*b* is white (S20). When the original sheets S have correctly been set on the original supporting base plate 2, since the entire data read by the lower sensor is white, the data read by the contact type image sensor 15*a* arranged on the upper original guide 16*a* is set to the data of the first page. When there are a plurality of original sheets S, the images of the original sheets S are read by the contact type image sensor 15*a* arranged on the upper original guide 16*a* and are copied and these operations are sequentially repeated (S21). After the images of the original sheets S were read, the sheets are further conveyed by the ejection roller 8*c* and are stacked onto the original ejection tray 18. In this instance, the original sheets S are sequentially read in accordance with the order of pages from the last page. The sheets are ejected and stacked onto the original ejection tray 18. After completion of the operation, the original sheets S are ejected and stacked onto the original ejection tray 18 in a face-up manner in accordance with the order of pages. The recording sheets S' are stacked onto the recording paper ejection tray 12 in a face-up manner in accordance with the order of pages from the last page.

In step S20, when the entire data read by the contact type image sensor 15*b* is not white, a check is made to see if the entire data of the contact type image sensor 15*a* arranged on the upper original guide 16*a* is white (S22). When the entire data is white, it is judged that the front and back sides of the original sheets S have erroneously been set. A warning to indicate that the setting direction of the original sheets is wrong is displayed on the display unit 25 and a warning sound is generated from the speaker 307 (S23). In this case, if the copy is performed as it is, in order to read the originals, the images of the original sheets S have to be read by the contact type image sensor 15*b* arranged on the lower original guide 16*b*. Therefore, the original sheets S are read in accordance with the reverse order of pages from the last page. Therefore, whether the pages can be copied in reverse or not is selected by the operator (S24). When the pages can be copied in reverse, the data read by the contact type image sensor 15*b* arranged on the lower original guide 16*b* is set to the data of the first page and is copied. When there are a plurality of original sheets S, the images of the original sheets S are read by the contact type image sensor 15*b* arranged on the lower original guide 16*b* and are copied and these operations are sequentially repeated (S25). After the images of the original sheets S are read, the sheets are further conveyed by the ejection roller 8*c* and are stacked onto the original ejection tray 18. In this instance, the original sheets S are sequentially read in accordance with the order of pages from the first page and are ejected and stacked onto the original ejection tray 18. After completion of the operation, the original sheets are ejected and stacked onto the original ejection tray 18 in a face-down manner in accordance with the order of pages. The recording sheets S' are stacked onto the recording paper ejection tray 12 in accordance with the order opposite to the order of pages so that the recording surfaces face up. When it is improper if the pages are copied in reverse, an error warning is displayed on the display unit 25 and a warning sound is generated from the speaker 307 (S10). The processing routine is finished as an error.

In steps S20 and S22, when both of the entire data read by the contact type image sensor 15*b* and the entire data read by the contact type image sensor 15*a* are not white, it is judged that both sides of the front and back surfaces of the original sheet S are originals, so that information indicating that the original sheet S is the both-side original is displayed on the display unit 25 and a warning sound is generated from the speaker 307 (S27). Whether both sides are to be copied or not is selected by the user (S28). In case of copying both sides, if the original sheets S have been set in a face-down state, the pages are copied in reverse. Therefore, the direction of the originals is confirmed by the user before copying (S29). When the originals have been set in a face-up manner, the image on the upper side is copied as a first page and the image on the lower side is subsequently copied as a second page. When there are a plurality of original sheets S, with respect to the next original sheet, in a manner similar to the first sheet, the images of both sides of the original sheet S are read by the contact type image sensors 15*b* and 15*a* arranged on the lower original guide 16*b* and upper original guide 16*a*, respectively, the image on the upper side is copied, the image on the lower side is copied, and these operations are sequentially repeated (S30). When the originals have been set in a face-down state, whether the pages can be copied in reverse or not is selected by the user (S31). When the pages can be copied in reverse, the both sides of the originals are copied in reverse (S30). When it is improper that the pages are copied in reverse, an error warning is displayed on the display unit 25 and a warning sound is generated from the speaker 307 (S32). The processing routine is finished as an error. When the both-side copy mode is not selected in step S28, whether only one-side is copied or not is selected by the user (S33). In case of copying only one side, the direction of the original surface is confirmed by the user (S34). When the originals have been set in a face-up state, the processing routine jumps to step S21. When the originals have been set in a face-down state, step S23 follows. In the case where both of the both-side copy and the one-side copy are not performed, an error warning is displayed on the display unit 205 and a warning sound is generated from the speaker (S19). The processing routine is finished as an error.

Figure 6:
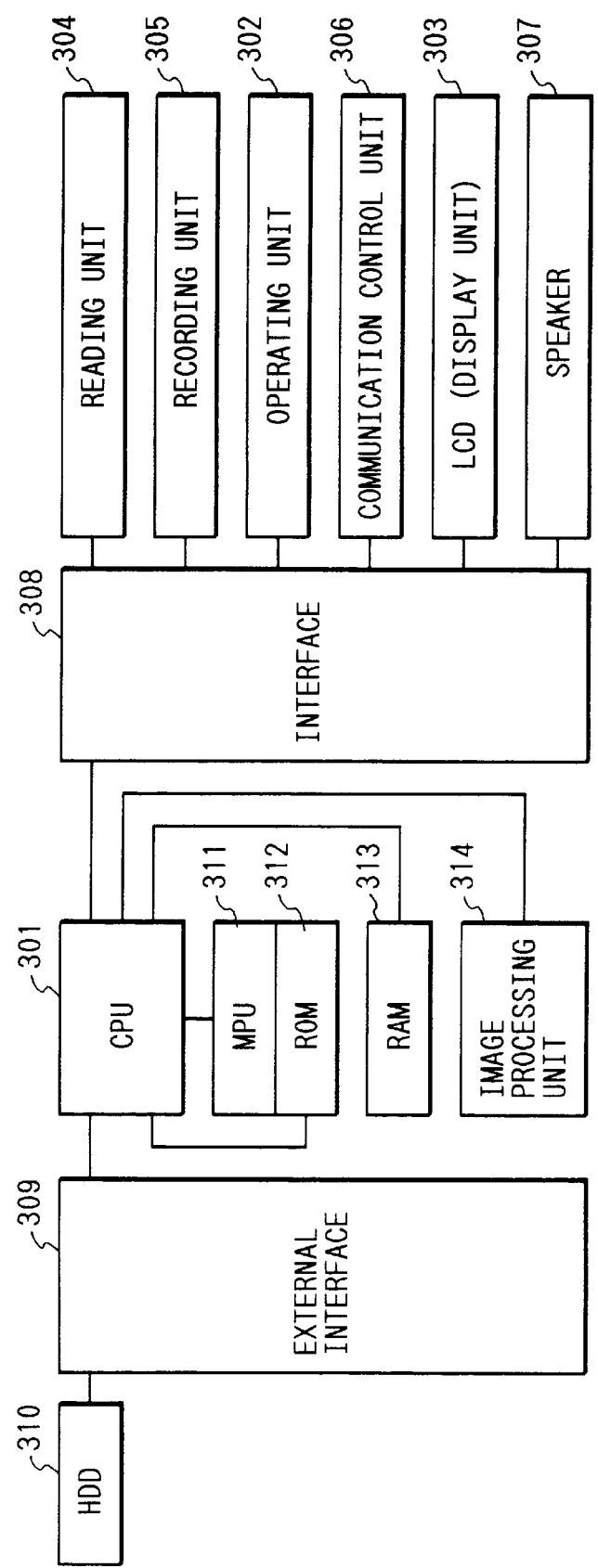
FIG. 6 is a block diagram of a control unit of the facsimile apparatus of the first embodiment.

An example of a block diagram of the control unit of the facsimile apparatus of the embodiment will now be described with reference to FIG. 6.

The control unit is constructed by: a reading unit 304; a recording unit 305; an operating unit 302; a communication control unit 306; an LCD (display unit) 303; the speaker 307; a CPU (central processing unit) 301; an MPU 311; an RAM 313; an ROM 312; and an image processing unit 314. In the diagram, reference numeral 301 denotes the CPU to control the whole facsimile apparatus. The CPU 301 is constructed by: the MPU 311; the ROM 312 to store a control program or the like of the MPU 311; the RAM 313 which is used as a work area of various data processes and a temporary memory unit of image information; and an image processing unit 314 to perform a variable magnification process of an image, a conversion of a resolution, or the like.

A calendar/timer function or the like comprising a well-known construction is provided for the CPU 301. In the RAM 313, an area to store important system set information such as one-touch key destination information, software switch information, etc. is protected by a battery backup from an unexpected fault such as a power failure or the like. A control system of the facsimile apparatus has a construction in which the foregoing CPU 301 and the following component elements 302 to 310 are coupled through interfaces 308 and 309.

The reading unit 304 comprises: a driving unit such as a read motor or the like; two reading sensors for reading images of the front and back sides of an original; an image processing unit for shading and binarizing the read images; various sensors for performing a detection of the original and the like.

The recording unit 305 is constructed by: a driving unit of the recording motor or the like; a recording unit to perform a control of the laser scanner and electrophotographic process or the like; an image processing unit for performing a smoothing process of an image to be recorded and the like; and various sensors for detecting the recording paper and the like.

The communication control unit 306 for performing an originating call, a reception call, an encoding of image data, and the like has a connecting unit comprising an MODEM, an NCU, and the like. A communication network and a handset are connected to the connecting unit.

The CPU external interface 309 is an interface to directly perform the transmission and reception of data to/from the CPU 301. By connecting the interface 309 to a computer out of the apparatus through a line such as RS232C, SDSI, LAN, or the like, the apparatus is used as a scanner printer or the like of the external computer. An HDD 310 is used as a non-volatile memory of a large capacity in order to store the image information or the like.

[Second embodiment]

Figure 7:
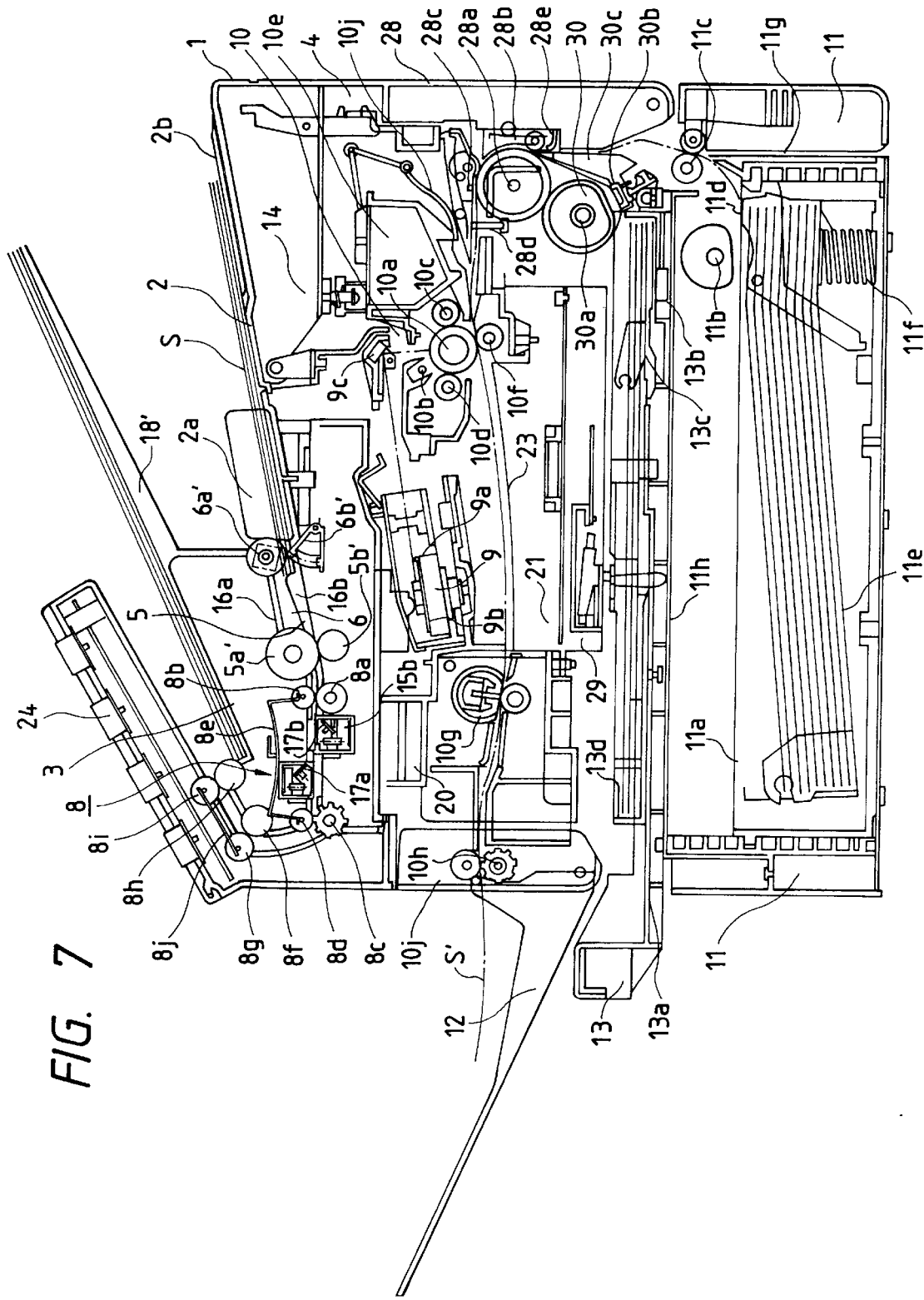
FIG. 7 is a cross sectional view of a facsimile apparatus of the second embodiment.

FIG. 7 shows a cross sectional view of a facsimile apparatus of the second embodiment of the invention.

The second embodiment differs from the first embodiment with respect to: a construction of a separating roller 5*a*' and a separating member 5*b*' of the separating means 5 for separating the stacked original sheets S one by one; an arrangement of a spare conveying roller 6*a*' and a spare pressure contact arm 6*b*' of the spare conveying means 6; an addition of a paper ejection conveying pre-roller 8*f*, a paper ejection conveying pre-roller 8*g*, a paper ejection conveying post-roller 8*h*, a paper ejection conveying post-roller 8*i*, and a roller paper ejection pressing spring 8*j* of the conveying means 8; and an arrangement of an original ejection tray 18'.

The original sheets S stacked on the original supporting base plate 2 are conveyed from the top sheet by the spare conveying roller 6*a*' and spare pressure contact arm 6*b*' and are separated and conveyed one by one from the top original sheet S by the separating roller 5*a*' and separating member 5*b*'. The original sheets S which were read by the contact type image sensors 15*a* and 15*b* are ejected out to the original ejection tray 18' by: the paper ejection roller 8*c*; the paper ejection roller 8*d* pressed by the roller pressing spring 8*e*; and the paper ejection conveying pre-roller 8*f*, paper ejection conveying pre-roller 8*g*, paper ejection conveying post-roller 8*h*, and paper ejection conveying post-roller 8*i* which are pressed by the roller paper ejection pressing spring 8*j*.

Figure 8:
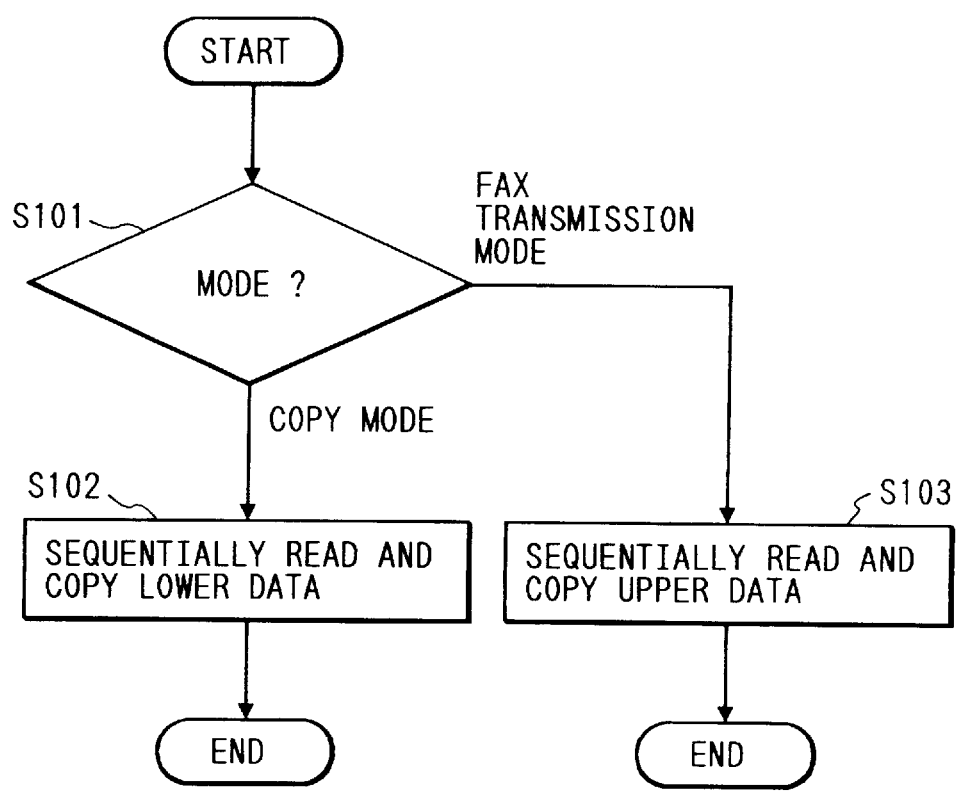
FIG. 8 is a flowchart in the second embodiment.
Figure 9:
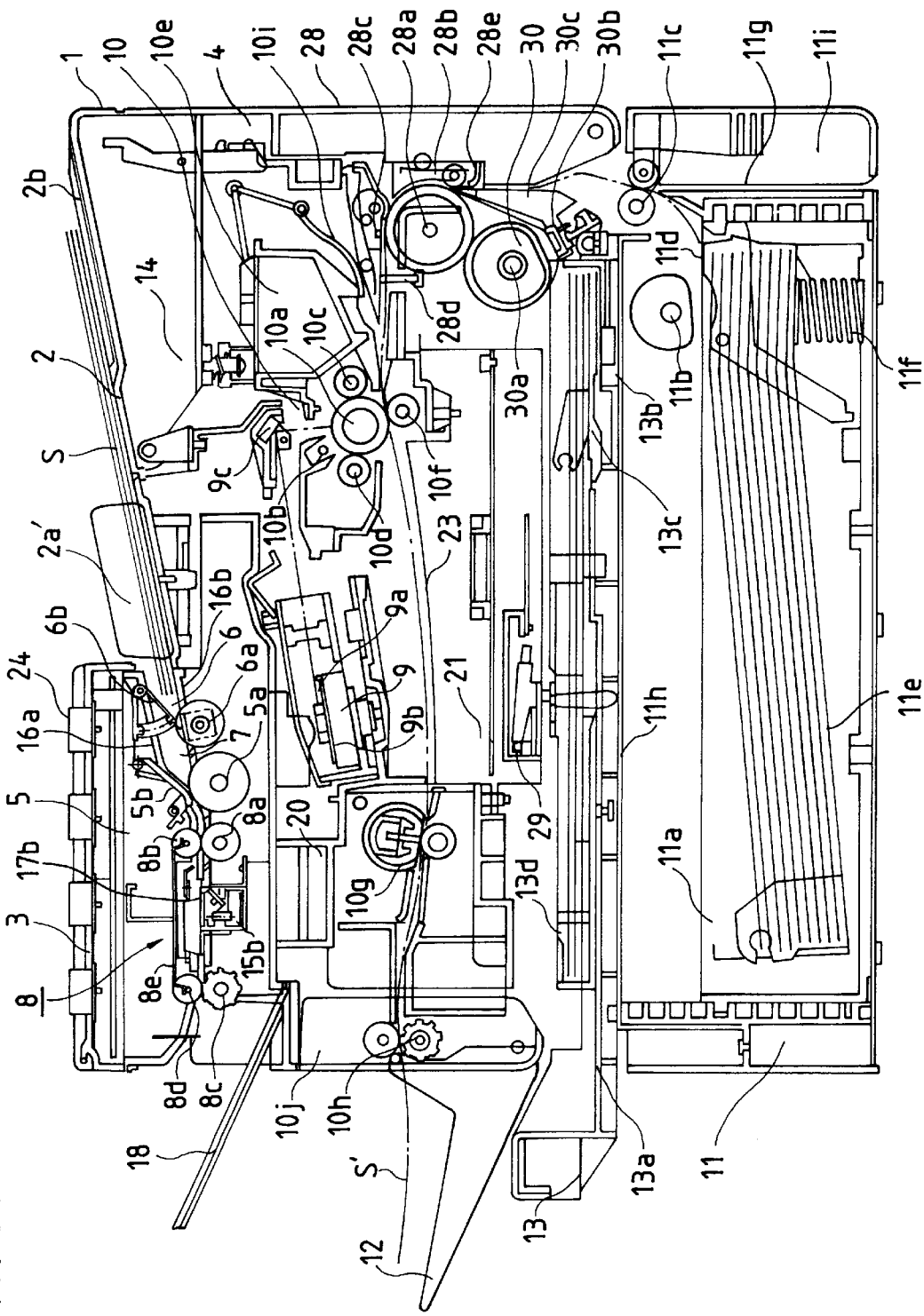
FIG. 9 is a cross sectional view of a conventional facsimile apparatus.

An example of the operation of the second embodiment of the facsimile apparatus embodying the invention will now be described with reference to FIG. 8.

In case of performing the facsimile transmission in the facsimile mode, the operator sets the original sheets S onto the original supporting base plate 2 in accordance with the order of pages so that the original surface faces up (in a face-up manner). In case of performing the copy mode, the operator sets the original sheets S onto the original supporting base plate 2 in accordance with the order of pages so that the original surface faces down (in a face-down manner).

The setting method of the originals is displayed on the display unit 25.

When the operation is started, the operation which is different depending on the function is executed (S101). When the facsimile transmitting operation is started, the original sheets S are conveyed to the separating means 5 by the spare conveying roller 6*a*' and spare pressure contact arm 6*b*' and are conveyed one by one from the top sheet by the separating roller 5a' and separating member 5b'. The original sheets are further conveyed by the feed roller 8a and the images are read by the contact type image sensor 15a arranged on the upper original guide 16a. After the images were read, the original sheets S are further conveyed by the paper ejection roller 8c and are stacked onto the original ejection tray 18'. In this instance, the original sheets are sequentially read in accordance with the order of pages from the first page and are ejected and stacked onto the original ejection tray. After completion of the operation, the original sheets are ejected and stacked onto the original ejection tray in a face-down manner in accordance with the order of pages (S102).

Namely, in the facsimile transmission mode, the original sheets are read from the first page and are transmitted from the first page. After completion of the transmission, the original sheets which were read are sequentially stacked in accordance with the order of pages.

When the copying operation is started, the original sheets S are conveyed to the separating means 5 by the spare conveying roller 6a' and spare pressure contact arm 6b' and are conveyed one by one by the separating roller 5a' and separating member 5b'. The original sheets S are further conveyed by the feed roller 8a and the images are read by the contact type image sensor 5b arranged on the lower original guide 16b. After the images were read, the original sheets S are further conveyed by the paper ejection roller 8c and are stacked onto the original ejection tray 18'. In this instance, since the original sheets S are sequentially read in accordance with the order of pages from the last page, the read images are recorded from the last page. The sheets are ejected out onto the recording paper ejection tray 12. The copied recording sheets S' which were ejected out are stacked from the top in accordance with the ejecting order so that the recording surface faces up (face-up). Therefore, after completion of the operation, the copied recording sheets are stacked in accordance with the order of pages so that the recording surface faces up (face-up) (S103).

Namely, in the copy mode, the original sheets are read from the last page and both of the original sheets and the copied recording sheets are sequentially stacked in accordance with the order of pages in a manner such that the original surface and the recording surface face up.

[Modifications of the embodiments]

1. In the above embodiments, the apparatuses having the recording unit of the laser beam printer have been mentioned. However, the invention can be also embodied by another recording method such as ink jet, thermal transfer, or the like and the invention is not limited to the above embodiments. Although the contact type image sensors have been used as image reading means, another means such as an optical reading unit using a CCD or the like can be also used and the invention is not limited to such image sensors. The flowcharts have also been shown and described as an example and don't limit the direction and function of the originals and the controls of the process, judgment, and the like of the data of the image sensors.

2. Although the facsimile apparatus having the copying function has been used as an image forming apparatus in the above embodiments, the invention is not limited to such an apparatus. The invention can be applied to a general image forming apparatus such as a copying apparatus which can be used as an image scanner by communicating with an external computer or the like. In this instance, the apparatus operates in a manner similar to the case of the facsimile transmission of the embodiments in a mode (for example, a mode for storing the original images to a hard disk, a magnetooptic disk, or the like; a mode for outputting the read original images to a computer; or the like) other than the copy mode.

What is claimed is:

1. An image reading apparatus comprising:

stacking means for stacking a plurality of originals;

separating means for sequentially separating an original in a bottom portion among said originals on said stacking means;

conveying means for conveying the original which was sequentially separated by said separating means along a conveying path;

first reading means for reading the original surface which faces up when it is stacked onto said stacking means when the original passes through said conveying path;

second reading means for reading the original surface which faces down when it is stacked onto said stacking means when the original passes through said conveying path; and control means for controlling said first and second reading means in accordance with a copy mode and a mode other than said copy mode,
wherein said control means allows said first reading means to read the original in said copy mode and allows said second reading means to read the original in the mode other than said copy mode, and
wherein said mode other than said copy mode is a facsimile transmission mode.

2. An apparatus according to claim 1, further comprising transmitting means for transmitting the image read by said second reading means to another apparatus.

3. An apparatus according to claim 1, further comprising recording means for recording the image read by said first reading means onto a sheet and for ejecting out said sheet in a state in which the surface on which the image was recorded faces up.

4. The image reading apparatus as claimed in claim 1, wherein the first reading means and the second reading means read the original when the original passes through said conveying path.

5. An image reading method in an apparatus having:

stacking means for stacking a plurality of originals, separating means for sequentially separating the original in the bottom portion among said originals on said stacking means, conveying means for conveying the original which was sequentially separated by said separating means along a conveying path, first reading means for reading the original surface which faces up when it is stacked onto said stacking means when the original passes through said conveying path, second reading means for reading the original surface which faces down when it is stacked onto said stacking means when the original passes through said conveying path, comprising the steps of:
putting the originals onto said stacking means in a copy mode in a face-up state;
putting the originals onto said stacking means in a mode other than said copy mode in a face-down state;
allowing said first reading means to read the original in said copy mode; and
allowing said second reading means to read the original in a mode other than said copy mode, wherein said mode other than said copy mode is a facsimile transmission mode.

6. The image reading method as claimed in claim 5, wherein the first reading means and the second reading means read the original when the original passes through said conveying path.

7. An image reading apparatus comprising:

original stacking means for stacking a plurality of originals;

separating means for sequentially separating the original in the bottom portion among said originals on said original stacking means;

conveying means for conveying the original which was sequentially separated by said separating means along a conveying path;

first reading means for reading the original surface which faces up when it is stacked onto said stacking means when the original passes through said conveying path;

second reading means for reading the original surface which faces down when it is stacked onto said stacking means when the original passes through said conveying path; and control means for controlling said first and second reading means in accordance with a copy mode and a mode other than said copy mode, wherein said control means outputs the original image which was read by said first reading means in said copy mode and outputs the original image which was read by said second reading means in the mode other than said copy mode, and wherein said mode other than said copy mode is a facsimile transmission mode.

8. The image reading apparatus as claimed in claim 7, wherein the first reading means and the second reading means read the original when the original passes through said conveying path.

9. An image reading method in an apparatus having:

stacking means for stacking a plurality of originals, separating means for sequentially separating the original in the bottom portion among said originals on said original stacking means, conveying means for conveying the original which was sequentially separated by said separating means along a conveying path, first reading means for reading the original surface which faces up when it is stacked onto said stacking means when the original passes through said conveying path, and second reading means for reading the original surface which faces down when it is stacked onto said stacking means when the original passes through said conveying path, comprising the steps of:

putting the originals onto said stacking means in a copy mode in a face-up state;

putting the originals onto said stacking means in a mode other than said copy mode in a face-down state;

outputting the original image which was read by said first reading means in said copy mode; and outputting the original image which was read by said second reading means in a mode other than said copy mode, wherein said mode other than said copy mode is a facsimile transmission mode.

10. The image reading method as claimed in claim 9, wherein the first reading means and the second reading means read the original when the original passes through said conveying path.

11. An image reading apparatus comprising:

original stacking means for stacking a plurality of originals;

separating means for sequentially separating the original in the top portion among said originals on said original stacking means;

conveying means for conveying the original which was sequentially separated by said separating means along a conveying path;

first reading means for reading the original surface which faces up when it is stacked onto said stacking means when the original passes through said conveying path;

second reading means for reading the original surface which faces down when it is stacked onto said stacking means when the original passes through said conveying path; and control means for controlling said first and second reading means in accordance with a copy mode and a mode other than said copy mode, wherein said control means allows said first reading means to read the original in said copy mode and allows said second reading means to read the original in the mode other than said copy mode, and wherein said mode other than said copy mode is a facsimile transmission mode.

12. An apparatus according to claim 11, further comprising transmitting means for transmitting the image read by said second reading means to another apparatus.

13. An apparatus according to claim 11, further comprising recording means for recording the image read by said first reading means onto a sheet and for ejecting out said sheet in a state in which the surface on which the image was recorded faces up.

14. The image reading apparatus as claimed in claim 11, wherein the first reading means and the second reading means read the original when the original passes through said conveying path.

15. An image reading method in an apparatus having:

stacking means for stacking a plurality of originals, separating means for sequentially separating the original in the top portion among said originals on said stacking means, conveying means for conveying the original which was sequentially separated by said separating means along a conveying path, first reading means for reading the original surface which faces down when it is stacked onto said stacking means when the original passes through said conveying path, and second reading means for reading the original surface which faces up when it is stacked onto said stacking means when the original passes through said conveying path, comprising the steps of:

putting the originals onto said stacking means in a copy mode in a face-down state;

putting the originals onto said stacking means in a mode other than said copy mode in a face-up state;

allowing said first reading means to read the original in said copy mode; and allowing said second reading means to read the original in a mode other than said copy modes , wherein said mode other than said copy mode is a facsimile transmission mode.

16. The image reading method as claimed in claim 15, wherein the first reading means and the second reading means read the original when the original passes through said conveying path.

17. An image reading apparatus comprising:

original stacking means for stacking a plurality of originals;

separating means for sequentially separating the original in the bottom portion among said originals on said original stacking means;

conveying means for conveying the original which was sequentially separated by said separating means along a conveying path;

first reading means for reading the original surface which faces down when it is stacked onto said stacking means when the original passes through said conveying path;

second reading means for reading the original surface which faces up when it is stacked onto said stacking means when the original passes through said conveying path; and control means for controlling said first and second reading means in accordance with a copy mode and a mode other than said copy mode, wherein said control means outputs the original image which was read by said first reading means in said copy mode and outputs the original image which was read by said second reading means in the mode other than said copy mode, and wherein said mode other than said copy mode is a facsimile transmission mode.

18. The image reading apparatus as claimed in claim 17, wherein the first reading means and the second reading means read the original when the original passes through said conveying path.

19. An image reading method in an apparatus having:

stacking means for stacking a plurality of originals, separating means for sequentially separating the original in the bottom portion among said originals on said original stacking means, conveying means for conveying the original which was sequentially separated by said separating means along a conveying path, first reading means for reading the original surface which faces down when it is stacked onto said stacking means when the original passes through said conveying path, and second reading means for reading the original surface which faces up when it is stacked onto said stacking means when the original passes through said conveying path, comprising the steps of:

putting the originals onto said stacking means in a copy mode in a face-down state;

putting the originals onto said stacking means in a mode other than said copy mode in a face-up state;

outputting the original image which was read by said first reading means in said copy mode; and outputting the original image which was read by said second reading means in a mode other than said copy mode, wherein said mode other than said copy mode is a facsimile transmission mode.

20. The image reading method as claimed in claim 19, wherein the first reading means and the second reading means read the original when the original passes through said conveying path.

* * * * *

UNITED STATES PATENT AND TRADEMARK OFFICE
CERTIFICATE OF CORRECTION

PATENT NO. : 5,826,133
DATED : October 20, 1998
INVENTOR(S) : MASAAKI SAITO, ET AL.

It is certified that error appears in the above-identified patent and that said Letters Patent is hereby corrected as shown below:

On the title page, item [56] insert the following:
Insert --Attorney, Agent, or Firm - Fitzpatrick, Cella, Harper & Scinto--.

COLUMN 6,
Line 7, "to the" should read --the--.

COLUMN 7,
Line 63, "speaker" should read --speaker 307--.

COLUMN 8,
Line 32, "the copy" should read --copying--.

COLUMN 9,
Line 33, "speaker" should read --speaker 307--.

COLUMN 12,
Line 52, "path," should read --path, and--.

COLUMN 14,
Line 15, "up" should read --down--; and
Line 67, "modes," should read --mode--.

Signed and Sealed this

Thirteenth Day of July, 1999

Attest:

Attesting Officer

Q. TODD DICKINSON

Acting Commissioner of Patents and Trademarks